United States Patent [19]

Wagner

[11] Patent Number: 4,656,742

[45] Date of Patent: Apr. 14, 1987

[54] PORTABLE COMPASS SAW

[75] Inventor: Rudolf Wagner, Stuttgart, Fed. Rep. of Germany

[73] Assignee: REMS-WERK Christian Föll und Söhne GmbH & Co., Waiblingen, Fed. Rep. of Germany

[21] Appl. No.: 761,601

[22] Filed: Aug. 1, 1985

[30] Foreign Application Priority Data

Aug. 1, 1984 [DE] Fed. Rep. of Germany ....... 3428445

[51] Int. Cl.⁴ .............................................. B23D 47/06
[52] U.S. Cl. .......................................... 30/372; 30/394
[58] Field of Search .................................... 30/392–394, 30/166 A, 372; 269/93, 101

[56] References Cited

U.S. PATENT DOCUMENTS 2,970,484 2/1961 Springer ........................... 30/292 X
3,834,019 9/1974 Smeltzer et al. ..................... 30/92
4,272,996 6/1981 Sauerweim ........................ 30/394 X Primary Examiner—Douglas D. Watts
Attorney, Agent, or Firm—Becker & Becker, Inc.

[57] ABSTRACT

A portable compass saw having an oscillation drive for a push rod, to which a saw blade is attached. The push rod has an angular cross-section, and is guided over part of its length on all sides in a housing. Guide surfaces, themselves formed by parts of the housing, are provided for the purpose of guidance on two opposite sides of the push rod. Roller bearings extending at right angles to the stroke direction are respectively located on the two other sides of the push rod. In the region of the oscillation drive, a pressure member acts on the push rod on the opposite side. This member loads the push rod in the direction toward the oscillation drive. The push rod is consequently guided in a trouble free manner in the housing in, and at right angles to, the direction of the stroke, so that no play occurs which may impair the saw cut.

19 Claims, 16 Drawing Figures

PORTABLE COMPASS SAW

BACKGROUND OF THE INVENTION

1. Field of the Invention

The present invention relates to a portable compass saw having a housing in which are accommodated a drive motor and an oscillation drive for a push rod to which a saw blade can be attached; the push rod is supported in the housing by at least one mounting.

2. Description of the Prior Art

In compass saws of this type, the saw blade is moved back and forth by means of the oscillation drive. In addition, an upwards and downwards movement can be superimposed on this reciprocating movement of the saw blade. In known compass saws, the push rod is formed by a round rod section which is mounted in a carriage disposed within the housing. The saw blade is attached to one end of the push rod. The carriage along with the mounting for the push rod, is connected to the oscillation drive. The round push rod can be rotated about its axis to a relatively great extent, so that precise guidance of the saw blade during sawing is not guaranteed. In addition to this, as a result of the carriage, the compass saw has a complicated construction, due to which not only is the susceptibility to disturbance increased, but further play occurs, which likewise reduces the accuracy of sawing. Therefore, the work piece cannot be sawn exactly at right angles to its axis with these compass saws.

An object of the present invention is to construct such compass saws in such a way that the saw blade is guided precisely, at right angles to the stroke direction, so that precise saw cuts are possible without the compass saw having a complicated and troublesome construction for this purpose.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
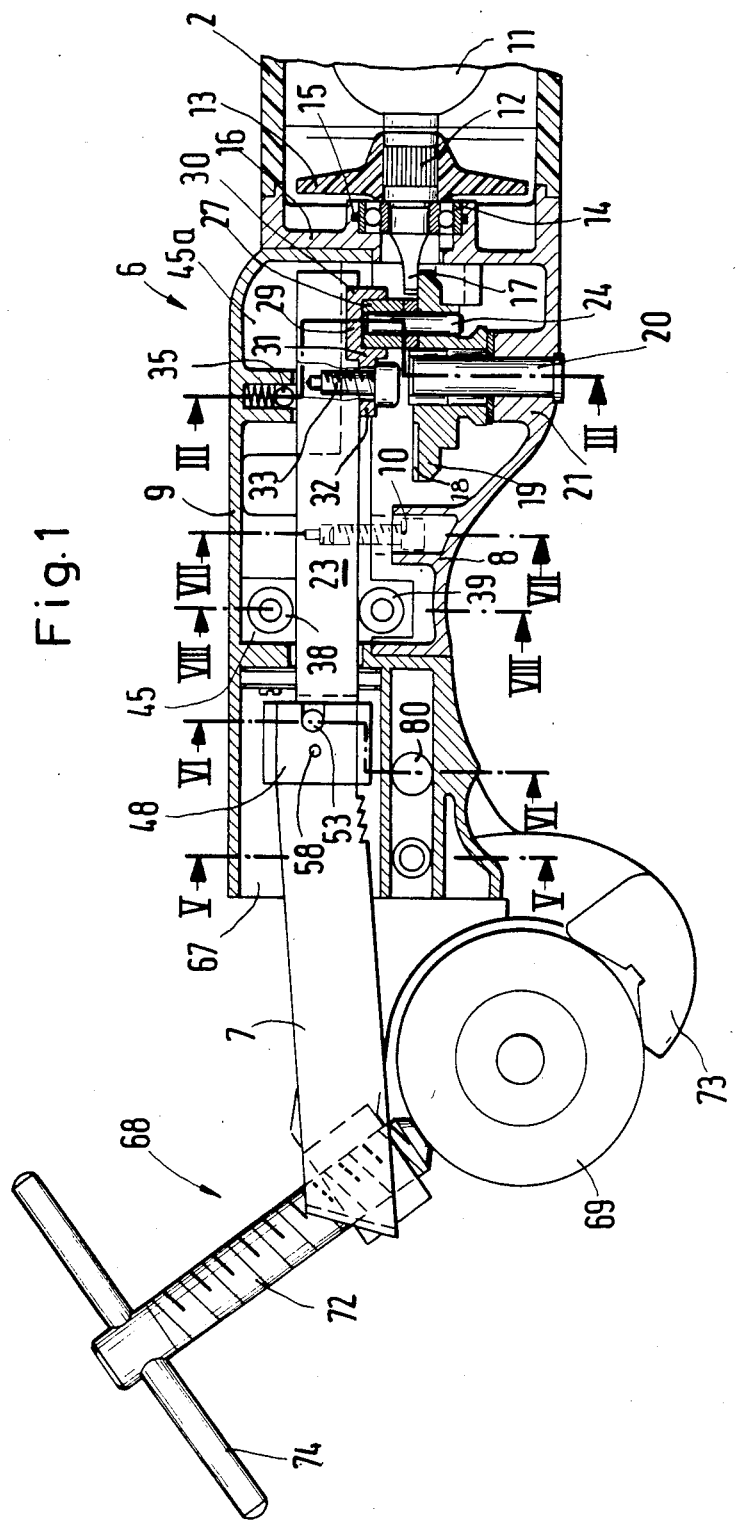
FIG. 1 shows one embodiment of a compass saw according to the invention, partly in longitudinal section and partly in elevation.

The compass saw according to the present invention is characterized primarily in that the push rod has an angular cross-section and is guided over part of its length on all sides in the housing; in that guide surfaces, themselves formed by parts of the housing, are provided on two opposite sides; in that at least one roller bearing, which extends at right angles to the stroke direction, is respectively provided on the two other sides of the push rod; and in that, in the region of the oscillation drive, at least one pressure member acts on the push rod on the opposite side, with this member loading the push rod in the direction toward the oscillation drive.

In the compass saw according to the present invention, the push rod is guided directly in the housing, due to which the saw blade connected to the push rod can be guided exactly. On the guide surfaces of the housing, the push rod can be guided in the stroke direction precisely and without play. The roller bearings, which rest directly on the push rod, guide the push rod likewise very accurately at right angles to the stroke direction. Thus, the push rod is guided in the housing in a trouble free manner in the stroke direction and at right angles thereto, so that no play which might impair the saw cut occurs. In addition, the push rod is also guided reliably in the region of the oscillation drive by the pressure member. One roller bearing supports the push rod against the cutting pressure which occurs during operation. Since the roller bearings are disposed at a distance from the oscillation drive, as a result of this support the end of the push rod is pressed in the direction toward the oscillation drive, so that a reliable drive of the push rod is ensured. The load is consequently largely removed from the pressure member, and the latter serves essentially merely for the guidance of the push rod. Furthermore, when the drive is switched off, the push rod is loaded by the pressure member in such a way that the push rod is guided without play. The compass saw according to the present invention has a simple construction, since no additional bearings and guide parts are necessary for the guidance of the push rod, as is the case in the known compass saws having the carriage which is able to move in the housing. Due to this, the susceptibility of the inventive compass saw to trouble is considerably reduced. As a result of the low number of components, the overall play in the housing is also substantially reduced; this has a particularly advantageous effect on the cutting accuracy.

Further features of the invention will become apparent from the following.

DESCRIPTION OF PREFERRED EMBODIMENTS

Referring now to the drawings in detail, the compass saw is a hand operated, lightweight implement, and has an elongated housing 1, which has an approximately oval or elliptical contour. The housing 1 (FIG. 13) has a housing part 2 in which an electric motor is located.

Adjoining one end of the housing part 2 is a handle 3 which extends in the longitudinal direction of the housing 1, and which is provided with a switch 4 for actuating the electric motor. A power connection cable 5 emerges from the handle 3 at the free end face thereof. Connected to the other end of the housing part 2 is a further housing part 6 in which a drive unit for driving a saw blade 7 is located. The housing parts 2 and 6, as well as the handle 3, are detachably connected to one another, so that the electric motor, the switching device, and the drive unit are easily accessible for the purpose of repair or maintenance.

Figure 4:
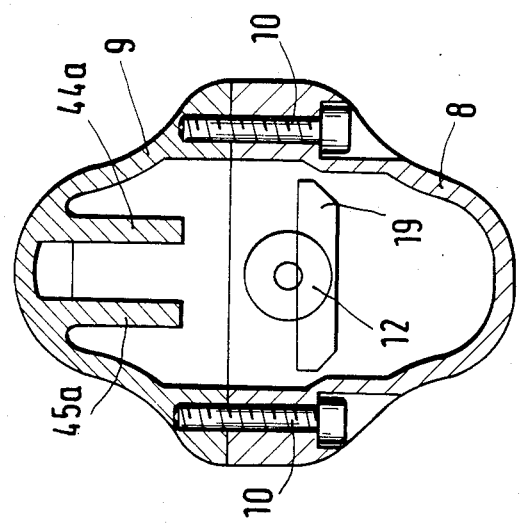
FIG. 4 is a section taken along line IV—IV of FIG. 2.
Figure 7:
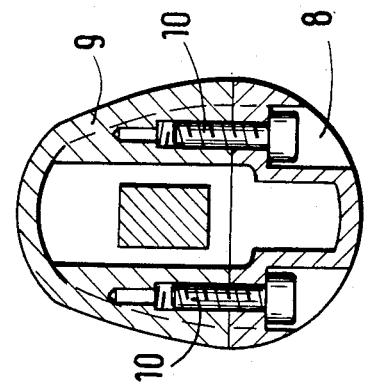
FIG. 7 is a section taken along line VII—VII of FIG. 1.

As shown in FIG. 1, the housing part 6 consists of two halves 8 and 9, which are detachably connected to one another by screws 10 (FIGS. 1, 4 and 7).

The electric motor 11, illustrated partially in FIG. 1, has a drive shaft 12 which is centrally disposed in the housing part 2, and on which a fan wheel 13 is seated inside the housing part 2. The drive shaft 12 is rotatably supported in the housing part 2 by a bearing 14 which is surrounded by a collar 15, which in turn projects inwardly from the end wall 16 of the housing part 2 and is constructed in one piece with the latter. The drive shaft 12 projects into the housing part 6, and its free end is constructed as a pinion 17 which engages in teeth 18 of a spur gear 19. The latter is seated on a shaft 20, which is mounted in a thickened projection projection 21 of the lower housing half 8 and projects in the direction of the upper housing half 9 at right angles to the axis of the drive shaft 12. By means of a needle bearing 22 (FIG. 3), the spur gear 19 is rotatably mounted on the shaft 20 and is supported axially on the housing projection 21. The spur gear 19 is located close to the housing part 2 in the housing part 6, and serves for the oscillating drive of a push rod 23, to the free end of which the saw blade 7 is connected.

Figure 2:
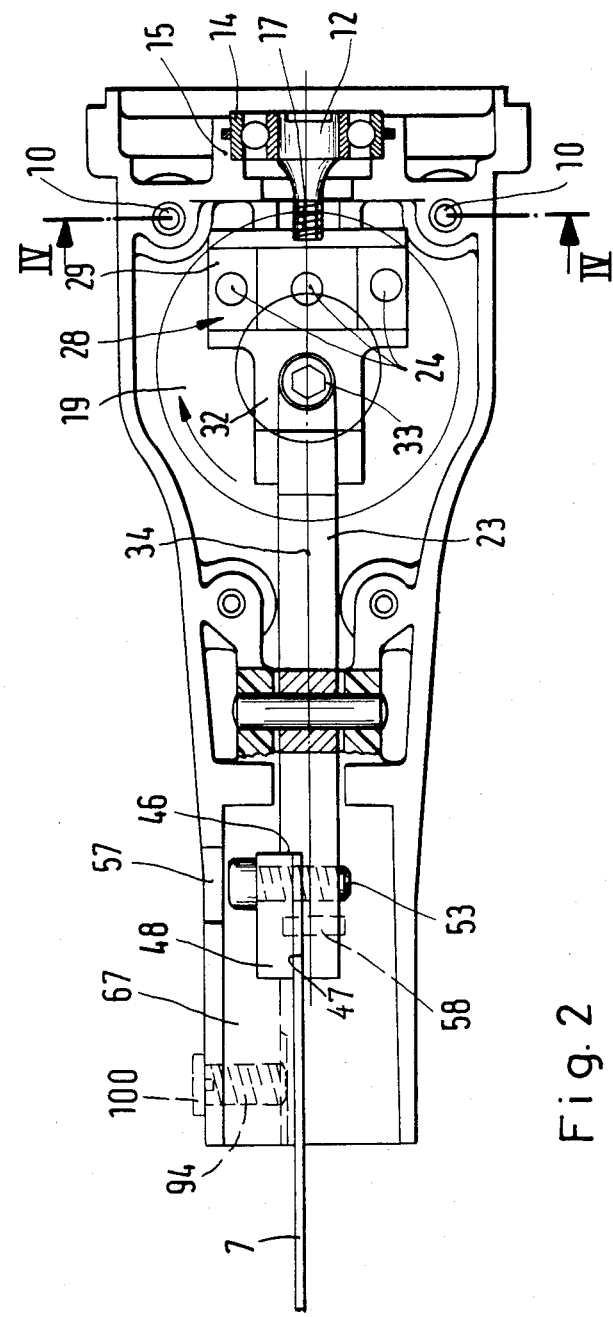
FIG. 2 is a plan view of a ower half of the compass saw of FIG. 1, with a bolt of an oscillation drive being shown in different positions.

In the area outside the region of engagement of the pinion 17, a pin or bolt 24, which is disposed parallel to the shaft 20, passes through the spur gear 19. The bolt 24 projects upwardly beyond the teeth 18, and is rigidly secured in the spur gear. Seated on the bolt 24 is a spacer sleeve 25 (FIG. 3) which is disposed on that side of the spur gear 19 which faces the push rod 23. The spacer sleeve 25 projects above the spur gear 19, and supports a sliding member 27 which is seated on the bolt 24 in such a way that it can rotate thereon. A clutch member 28 (FIGS. 2 and 3), which has a T-shape in plan view, is moved back and forth in an oscillating manner in the housing part 6 in the longitudinal direction of the latter by means of the sliding member 27. The push rod 23 is attached to the clutch member 28. The T-shaped clutch member 28 has a cross-piece 29, which has a U-shaped cross-section (FIG. 1). Its inside width corresponds to the width of the sliding member 27, which is disposed between the sides 30 and 31 of the cross-piece 29. That end of the push rod 23 remote from the saw blade 7 is detachably connected by means of a screw 33 to the foot 32 (FIG. 2) of the clutch member 28. As shown in FIG. 1, the push rod 23 extends, in the direction toward the housing part 2, beyond the cross-piece 29 of the clutch member 28. The cross-piece 29 is provided with an appropriate recess on its upper side for receiving the push rod 23. The longitudinal axis of the cross-piece 29 extends at right angles to the longitudinal axis 34 of the push rod 23 (FIG. 2). The sliding member 27 is able to move back and forth in the cross-piece 29 of the clutch member 28 during the rotation of the spur gear 19. As soon as the spur gear 19 rotates, the bolt 24 is entrained or taken along. Since the sliding member 27 is held positively in the cross-piece 29, during the rotation of the spur gear 19 the sliding member 27 is moved back and forth within the cross-piece 29, in which case the cross-piece 29, and thus the entire clutch member 28, are moved back and forth in the axial direction of the push rod 23. The cross-piece 29 is of such a length that the sliding member 27 does not come free from the cross-piece. In this way, the rotary movement of the bolt 24 is converted by the sliding member 27 into an oscillating movement of the push rod 23, and hence of the saw blade 7. The size of the stroke is determined by the distance of the bolt 24 from the shaft 20 of the spur gear 19.

Figure 3:
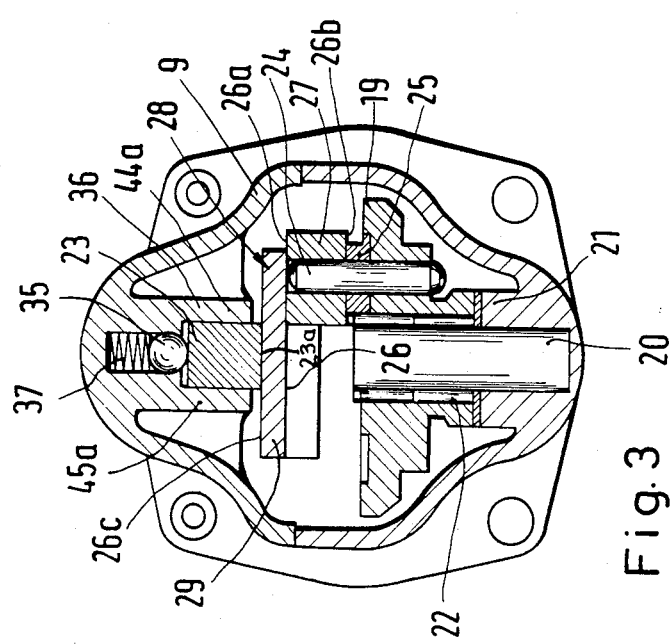
FIG. 3 is a section taken along line III—III of FIG. 1.

In order that the saw blade 7 not only carries out a reciprocating movement, but also moves up and down, namely carries out a so-called vertical stroke, the underside 26 of the cross-piece 29 is inclined at an acute angle with respect to the upper side of the spur gear 19. In the illustration of FIG. 3, the underside 26 rises from left to right. The upper side 26a of the sliding member 27 is inclined in a corresponding manner. The underside 26b of the sliding member 27 is disposed at right angles to the shaft 20 and bolt 24, and is parallel to the upper side of the spur gear 19. In the illustrated embodiment, the upper side 26c of the cross-piece 29 is parallel to its underside 26. The underside 23a of the push rod 23 is inclined in a corresponding manner, so that it can rest on the cross-piece 29 in an optimum manner. The upper side 26c and the underside 23a may, however, also be parallel to the upper side of the spur gear 19. However, the clutch member 28 is easier to produce if the upper and lower side 26c and 26 are parallel to one another.

In FIG. 2, the different positions of the bolt 24 with respect to the cross-piece 29 are illustrated during rotation of the spur gear 19. During the movement of the bolt 24 relative to the cross-piece 29, as a result of the inclined sides 26, 26a, the clutch member 28 moves up and down in the axial direction of the shaft 20. The push rod 23 and the saw blade 7 thus also carry out this movement. The downward movement of the clutch member 28 is ensured by the push rod 23, which as a result of the saw pressure exerts a force on the clutch member, with this force being directed toward the spur gear 19. As a result of the previously described construction of the drive, the saw blade carries out a reciprocating movement as well as a superimposed vertical stroke. Consequently, the saw blade 7 moves virtually on an elliptical path. This elliptical stroke is particularly advantageous for the removal of chips and for the return stroke of the saw blade during sawing, without any pressure having to be exerted on the back of the saw teeth.

At the height of the foot 32 of the clutch member 28, on the side opposite the spur gear 19, the push rod 23 is guided by a ball 35 which is under the force of a spring (FIGS. 1 and 3). The ball is mounted in a cylindrical projection 36, wich is provided on the inside of the upper housing half 9 and is constructed in one piece with the latter. Also located in the projection 36 is a compression spring 37, which presses the ball 35 against the push rod 23. Thus, by means of the ball 35, it is ensured that the push rod 23 is guided without play close to its free end. The spring-loaded ball 35 also assists in the upward stroke of the clutch member 28.

Figure 8:
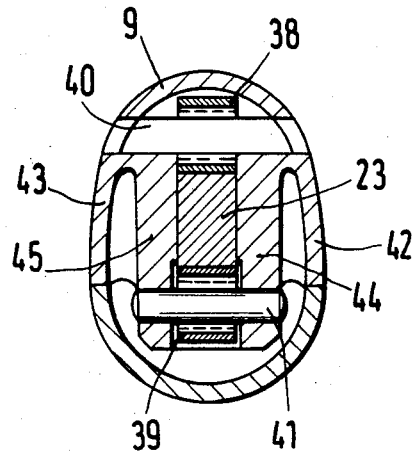
FIG. 8 is a section taken along line VIII—VIII of FIG. 1.

At a distance from the spur gear 19 and the ball support 35, the push rod 23 is guided precisely on the upper and lower side by two needle bearings 38 and 39 at right angles to the direction of the stroke. As shown in FIG. 8, the needle bearings 38, 39 are seated on bearing pins or bolts 40, 41 which are parallel to one another. The ends of the upper bearing bolt 40 are mounted in the opposing wall sections 42 and 43 of the upper housing half 9. The lower bearing bolt 41 is mounted in intermediate walls 44 and 45, which are provided inside the housing part 6 and also guide the push rod 23 in the axial direction. In the region above the spur gear 19, the push rod 23 is likewise guided by the facing inner sides of two intermediate walls 44a, 45a (FIGS. 3 and 4), of the housing part 6, which are spaced from, and are in alignment with, the intermediate walls 44, 45. The intermediate walls 44a, 45a terminate at a slight distance from the clutch member 28, so that the vertical stroke of the latter is not impeded.

The push rod 23 has an approximately rectangular cross-section, and is arranged on its edge, so that with respect to the cutting pressure occurring at the time of sawing, the push rod has a high moment of resistance. In place of the rectangular cross-section, the push rod 23 may also have an approximately square cross-section. The two needle bearings 38, 39 support the push rod 23 with respect to the cutting pressure occurring during sawing. Since the needle bearings 38, 39 are disposed at a distance from the spur gear 19 close to the end face of the compass saw, the push rod 23 is supported on the upper needle bearing 38 during sawing in such a way that its free end is pushed in the direction toward the spur gear. The push rod 23 thus carries out a type of swinging movement about its support point on the upper needle bearing 38. Thus, during sawing, the load is largely removed from the ball 35, which serves essentially exclusively for guiding the push rod 23. Furthermore, due to the pinion 17, a force is exerted on the spur gear 19 in the operative and in the non-operative position. If the compass saw is not operating, or if sawing with the latter is not taking place, then the ball 35 bears under spring force against the push rod 23 and prevents it from tilting about the needle bearing support. Pressure in the direction of its shaft is thus exerted constantly on the spur gear 19. There is therefore no need for the spur gear 19 to be secured axially; it merely has to be placed on the shaft 20. The assembly of the compass saw is consequently facilitated. Since the push rod 23 is guided on all sides by the needle bearings 38, 39, the intermediate walls 44, 45, 44a, 45a, and the ball 35, the push rod, and thus also the saw blade 7, may be guided precisely, so that very accurate cuts can be produced with the inventive compass saw, i.e. cuts disposed exactly at right angles to the axis of the workpiece.

The width of the needle bearings 38, 39 corresponds to the width of the push rod 23 (FIG. 8), whereas the intermediate walls 44, 45, 44a, 45a, which are constructed in one piece with the housing part 6, extend beyond part of the length of the push rod (FIG. 1). Thus, as the push rod moves back and forth, it is consequently guided at all times without play in the stroke direction and at right angles thereto. In this case, the needle bearings 38, 39 ensure that the push rod 23 can be moved with an easy motion. In place of the needle bearings 38, 39, ball bearings or other roller bearings may also be used, with which a play-free guidance and support of the push rod 23 is ensured.

Figure 16:
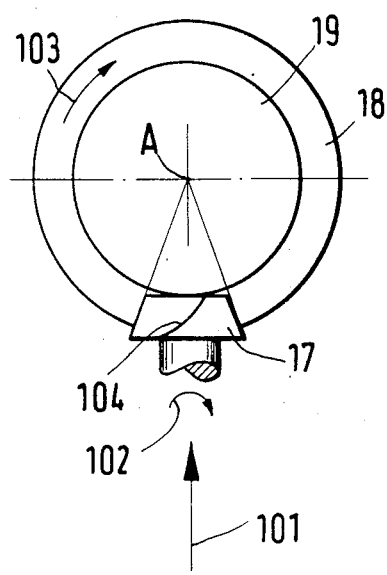
FIG. 16 is a plan view of a spur gear and a pinion of the oscillation drive of the inventive compass saw.

The teeth of the pinion 17 and of the spur gear 19 are constructed in such a way that as it rotates, the pinion experiences a pushing or shearing force component 101 (FIG. 16) in the direction toward the axis A of the spur gear. In the illustration according to FIG. 16, the pinion 17 rotates in the clockwise direction, in the direction of the arrow 102, viewed in the axial direction. The spur gear 19 is consequently rotated in the clockwise direction, in the direction of arrow 103, seen in a plan view. In this case, the teeth 104 of the pinion 17 are right-handed, and the teeth 18 of the spur gear 19 are left-handed. This produces the desired shearing force component 101, which ensures a reliable engagement of the pinion 17 in the spur gear 19, and thus ensures a trouble-free drive.

Figure 6:
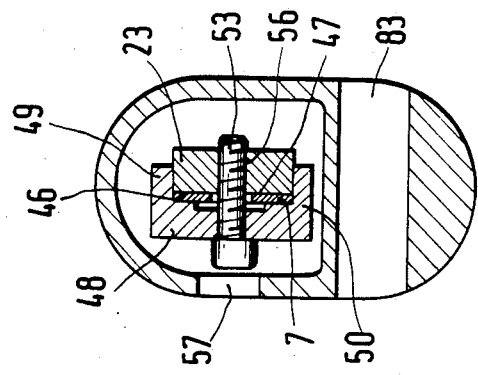
FIG. 6 is a section taken along line VI—VI of FIG. 1.
Figure 10:
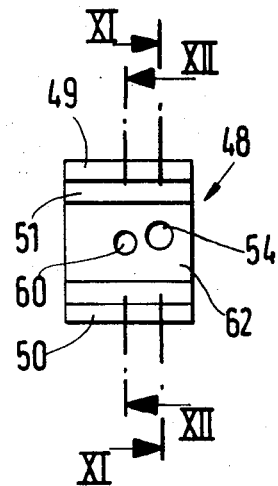
FIG. 10 is a plan view of a contact piece of the inventive compass saw.
Figure 11:
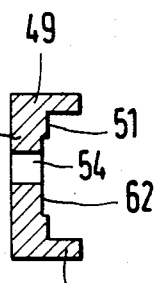
FIG. 11 is a section taken along line XI—XI of FIG. 10.
Figure 12:
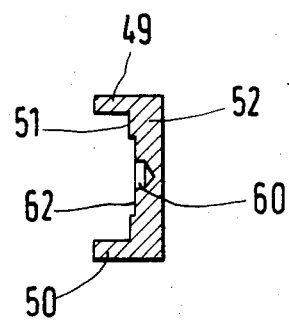
FIG. 12 is a section taken along line XII—XII of FIG. 10.

That end of the push rod 23 remote from the spur gear 19 is flattened on its side (FIG. 2). The flattening is formed by a recess 46 which extends as far as the free end (FIGS. 2 and 6). The recess 46 is provided on that side of the push rod which extends parallel to the intermediate wall 45, and extends over the entire height of the push rod. The base 47 of this recess 46 serves as a contact surface for the saw blade 7, which is held against the base 47 by a thrust or contact piece 48 (FIGS. 10 to 12). The thrust piece 48 is constructed substantially with a U-shape, and has sides 49 and 50 which are parallel to one another, and with which it partially overlaps the push rod 23 on the upper and lower side. The distance between the sides 49 and 50, which are of equal length, thus corresponds to the height of the push rod 23 (FIG. 6). The saw blade 7 bears against the base 51 of a cross-piece 52 of the thrust piece 48. The saw blade 7 has the same height as the push rod 23, so that it extends between the two sides 49 and 50 of the thrust piece 48. A tightening screw 53 projects through a bore 54 in the cross-piece 52 of the thrust piece 48, through an insertion opening 55 of the saw blade 7 (FIG. 9), and is screwed into a threaded bore 56 in the push rod 23. At the height of the tightening screw 53, the housing part 6 is provided with an opening 57 (FIG. 2) through which the tightening screw 53 is accessible from outside for tightening or release.

In order to be able to attach the saw blade 7 to the push rod 23 in an accurate position and in a simple manner, a centering pin 58 which projects beyond the base 47 of the recess 46 is provided close to the free end of the push rod 53 (FIG. 2). The pin 58 projects through a centering opening 59 in the saw blade 7 (FIG. 9), and projects into a blind hole 60 in the cross-piece 52 of the thrust piece 48 (FIGS. 10 and 12). The bore 54 and the blind hole 60 in the thrust piece 48 are slightly staggered with respect to one another, so that the assembly of the thrust piece on the push rod 23 can be carried out without any mistake. The insertion opening 55 in the saw blade 7 is likewise staggered with respect to the centering opening 59, so that the saw blade can be attached to the push rod 23 in an effortless manner from outside in the correct installation position.

To assemble the saw blade 7, the tightening screw 53 is first of all loosened to such an extent that the thrust piece 48 can be moved into an assembly position on the tightening screw. In this case, the cross-piece 52 of the thrust piece 48 is at such a distance from the base 47 of the recess 46 that the saw blade 7 can be slid between the thrust piece and the push rod 23, or its centering pin 58. The insertion opening 55 is open toward the end face 61 of the saw blade, so that it can be inserted without difficulty between the thrust piece and the push rod. The tightening screw 53 then engages in the insertion opening 55 of the saw blade 7. Furthermore, the saw blade 7 is fitted via its centering opening 59 on the centering pin 58 of the push rod. Thus, the saw blade is aligned in a simple manner exactly with respect to the push rod 23. It is then merely necessary for the tightening screw 53 to be tightened, in which case the thrust piece 48 holds the end of the saw blade against the push rod 23. In so doing, the centering pin 58 of the push rod 23 extends into the blind hole 60 in the thrust piece 48.

Figure 9:
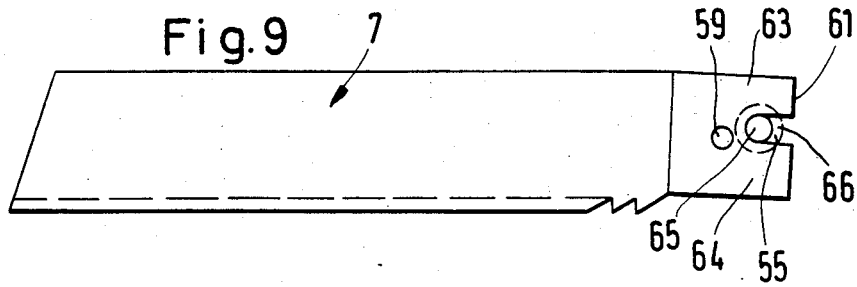
FIG. 9 shows a saw blade of the compass saw according to the present invention in elevation.

The base 51 of the cross-piece 52 of the thrust piece 48 is provided with a recess 62 which serves to receive conventional saw blades which are narrower than the saw blade illustrated in FIG. 9. Thus, conventional saw blades as well as wider saw blades 7 provided for the compass saw described can be used with the thrust piece 48. The recess 62 is shallower than the thickness of the saw blade which is to be centered therein, so that the latter can likewise be clamped reliably between the thrust piece and the push rod 23.

The insertion opening 55 of the saw blade 7 is defined by two clamping sections 63 and 64 of equal length. These sections serve to receive the tightening screw 53, and to guide the latter during the insertion of the saw blade 7 between the thrust piece 48 and the push rod 23. The shaft 65 of the clamping screw 53 rests against the base of the insertion opening 55. At the time of clamping, a clamping force is exerted on the clamping sections 63, 64 by means of the screw head 66. Since the clamping sections 63, 64 are of equal length and equal width, the clamping force occurring in this case is distributed uniformly to both of the clamping sections 63, 64, so that the saw blade 7 can be clamped between the thrust piece 48 and the push rod 23 in a manner free from tipping and tilting. Due to this, even during the clamping operation, the saw blade remains in its exactly aligned position with respect to the push rod 23. In conjunction with the play-free guidance of the push rod, this contributes to the very precise saw cut. The sawing time and the useful life of the saw blade 7 are substantially increased in comparison with known compass saws by the aforedescribed construction of the compass saw, in particular the guidance and clamping of the push rod 23 and of the saw blade 7. Due to the push rod 23 being placed on edge, in conjunction with the precise guidance, the saw blade 7 is guided absolutely vertically in the vertical direction, so that a right-angled cut can be achieved in a simple manner even horizontally. Due to the previously described construction of the thrust piece 48 and of the free end of the push rod 23, all commercially available saw blades can be used, so that even if new compass saws are purchased, the existing saw blades can continue to be used.

The clamping sections 63, 64 of the saw blade 7 have a substantially rectangular cross-section. Naturally, the clamping sections 63, 64 could also have a different construction; for example, they may have a triangular shape, an L-shape, etc. It is merely necessary that they have a shape such that at the time of clamping between the thrust piece 48 and the push rod 23, the saw blade 7 does not tip or tilt, so that the saw blade always remains aligned vertically.

As shown in FIGS. 1 and 2, the thrust piece 48 is located in a mounting space 67 which is open toward the end face of the housing part 6. The mounting space 67 is of such a length that the thrust piece does not emerge from the mounting space during the oscillating movement of the push rod 23.

The housing 2 is widest in the region of the housing part 2, which accommodates the electric motor 11, and in the region of the spur gear 19. In the region of the spur gear 19, the housing part 6 is partially adapted to the contour of the spur gear (FIG. 2), and tapers in the direction toward the free end. Consequently, the compass saw has a very compact construction, as a result of which the compass saw is convenient to handle. As a result of the simple construction of the drive unit for producing the oscillating movement of the push rod 23, the compass saw is also relatively light weight, so that it is possible to operate the compass saw over relatively long periods of time without tiring.

Figure 13:
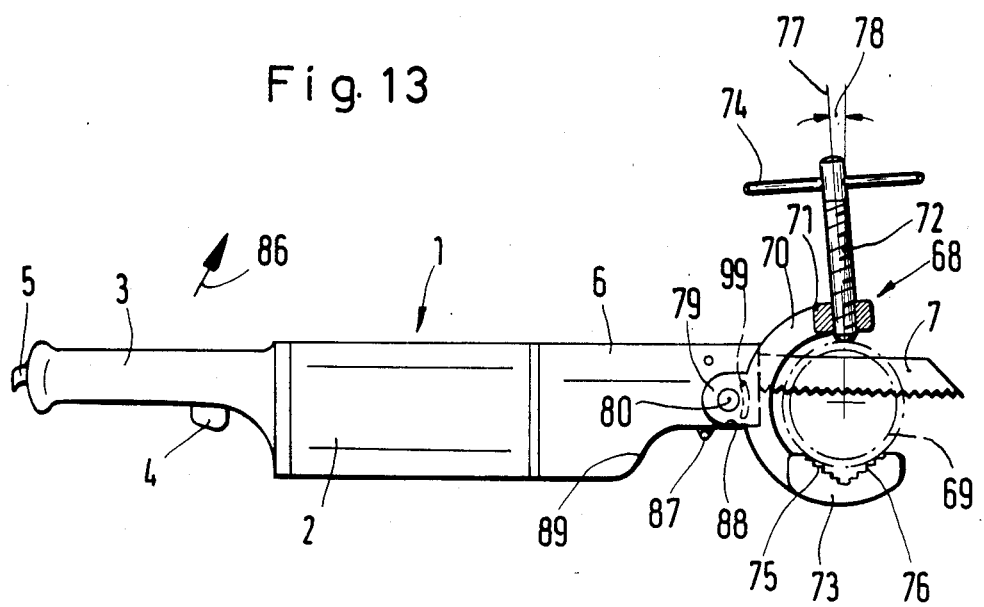
FIG. 13 shows one embodiment of the compass saw according to the invention with an attached clamping mounting for a workpiece which is to be sawed off, in elevation.
Figure 14:
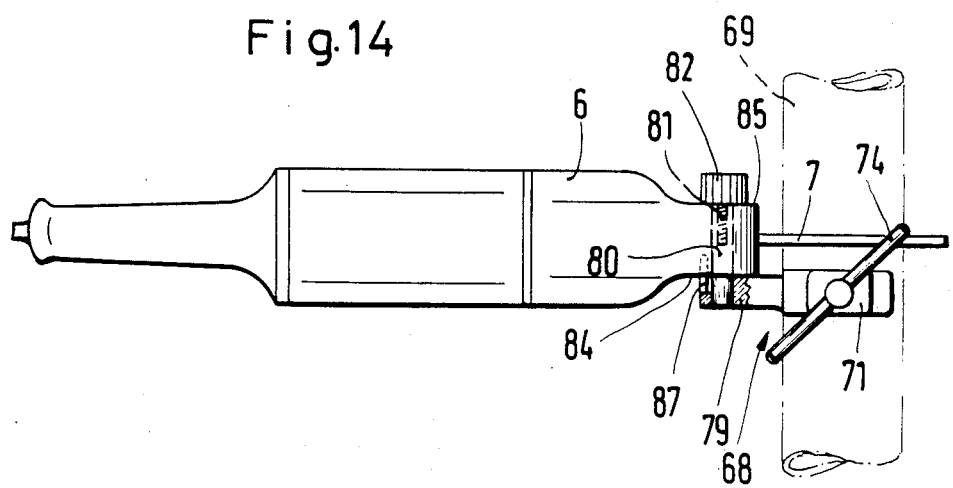
FIG. 14 is a plan view of the arrangement of FIG. 13.

A clamping device 68 can be connected to the housing part 2; with this device, the workpieces 69 which are to be machined can be clamped (FIGS. 1, 13 and 14). As shown in detail in FIGS. 13 and 14, the clamping device 68 has a bracket 70 which is bent in the shape of a semicircle. One end of the bracket is provided with a spindle nut 71 for a clamping spindle 72, and the other end is provided with a clamping jaw 73. Provided at the free end of the clamping spindle 72 is a handle 74, by means of which the clamping spindle can be easily rotated. The clamping jaw 73 has two clamping surfaces 75 and 76 which are inclined in opposite directions, and on which the workpiece 69 is supported. The clamping surfaces 75, 76 are provided with teeth, so that the workpiece 69 can be clamped reliably during sawing. Since the forces occurring during sawing are relatively low, it is not necessary for the clamping surfaces 75, 76 to have teeth; even then the workpiece 69 is held securely during sawing. The axis 77 of the clamping spindle 72 is disposed at an acute angle 78 with respect to the plane of the symmetry of the clamping jaw 73, and is inclined obliquely outwards (FIG. 13). This position of the clamping spindle 72 ensures that the workpiece 69 is pressed into the clamping device 68 during clamping, as a result of which the workpiece is held particularly securely in the clamping device. However, the clamping spindle 72 may also be disposed in the plane of symmetry of the clamping jaw 73.

The bracket 70 is provided with an extension or flap 79 which projects outwardly and which is provided with a bolt 80 projecting perpendicularly. The free end of the bolt has a blind hole 81 which is provided with an internal thread for a securing screw 82. Close to its end face, the housing part 6 is provided with a through hole 83 which extends at right angles to the stroke direction of the push rod 23 (FIG. 6), and in which the bolt 80 of the clamping device 68 is inserted. In the region of the through hole 83, the housing part 6 has outer sides 84 and 85 which extend parallel to one another (FIG. 14), and against which the flap 79 of the clamping device, or the head of the securing screw 82, may rest. The outer sides 84, 85 are parallel to the plane of the saw blade, so that the clamping device 68 can be aligned exactly parallel to the saw blade 7.

The clamping device is pivotably attached to the housing 1 of the compass saw by means of the bolt 80 and the securing screw 82. If it is intended to saw through the workpiece 69, the latter is first of all clamped in the clamping device. Moreover, the workpiece 69 can be clamped in known manner on a vise or the like (not shown). The compass saw is now tilted with respect to the clamping device in such a way that the saw blade 7 rests on the workpiece 69. The compass saw is then switched on by the switch 4, so that the saw blade 7 carries out the elliptical stroke.

During sawing of the workpiece 69, the compass saw is tilted with respect to the clamping device 68 in the direction of the arrow 86 in FIG. 13, in which case the saw blade 7 constantly penetrated deeper into the workpiece 69 until it is sawed completely through. The clamping device 68 can be easily released from, or mounted on, the compass saw by means of the securing screw 82 and the bolt 80, so that the clamping device need only be attached to the compass saw in case of need. The clamping device 68, which is supported on the side of the housing part 6 by means of the flap 79, contributes to the exact cut, since due to the latter the compass saw is prevented from being applied obliquely to the workpiece 69 accidentally. In conjunction with the precise guidance of the saw blade and the push rod, the workpieces 69 may thus be sawed exactly vertically.

In order that the clamping device 68 cannot swing into the gripping region on the housing part 6 when the compass saw is being carried, the latter is provided with a stop 87, with which the clamping device can come into abutment against one underside 88 of the housing part 6 (FIG. 13). The clamping device 68 can therefore only swing into the end position illustrated in FIG. 13 with respect to the housing 1. When the operator grips the compass saw by one hand on the handle 3, and by the other hand supports it at the other end in the gripping region 89, there is no danger that the hand may be trapped or squeezed in the gripping region by the clamping device 68 swinging back.

Figure 5:
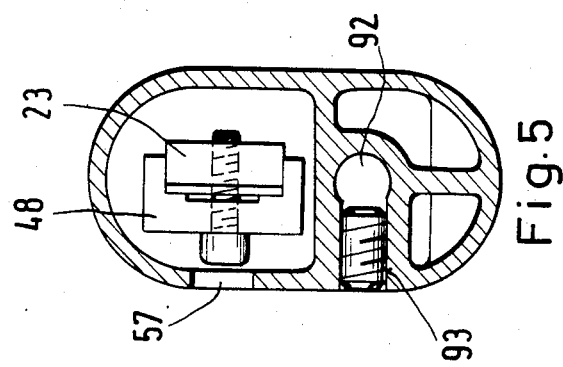
FIG. 5 is a section taken along line V—V of FIG. 1.
Figure 15:
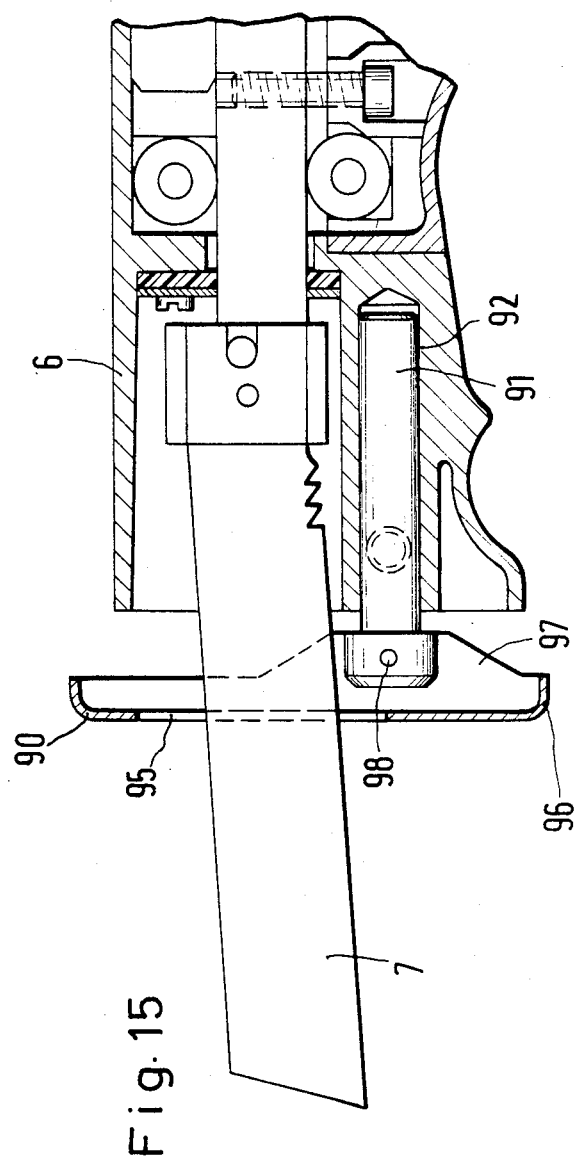
FIG. 15 shows the front end of one embodiment of the compass saw according to the invention with a support shoe, in longitudinal section.

In place of the clamping device 68, a support shoe 90 may be attached to the free end of the compass saw (FIG. 15). This support shoe 90 is pivotably seated on a pintle 91, which is inserted in an axial receiving means 92 located below the mounting space 67 in the housing part 6 (FIG. 5). The receiving means 92 opens into the end face of the housing part 6, and is centrally disposed therein. Located at right angles to the receiving means 92, and at a distance from the end face, is a threaded bore 93 (FIG. 5) which opens into the receiving means and is provided for a setscrew 94 (FIG. 2), by means of which the pintle 91 can be clamped. The support shoe 90 has a through hole 95, for the saw blade 7, which is of such a size that the saw blade can move unimpeded. The edge 96 of the support shoe 90 is rounded off in the direction toward the compass saw, and serves as a skid by means of which the compass saw rests on the workpiece which is to be sawed. The support shoe 90 is provided with a side piece or flap 97 which extends toward the compass saw, and to which the pintle 91 is attached by a securing pin 98 which extends at right angles to the saw blade 7.

Serving as a stop for the clamping device 68 in place of the stop 87, a groove 99 in the shape of part of a circle (FIG. 13) may be provided in the flap 79 on the side facing the housing part 6; the groove is curved about the axis of the bolt 80. Engaging in the groove 99 as a stop member is the head 100 (FIG. 2) of a screw (not shown) which is screwed into the threaded bore 93. The ends of the groove 99, which are rounded off to correspond to the head 100 form counterstops for the screw head, against which the latter bears in the two end positions of the clamping device 68.

The present invention is, of course, in no way restricted to the specific disclosure of the specification and drawings, but also encompasses any modifications within the scope of the appended claims.

What I claim is:

1. A portable compass saw having a housing in which are accommodated a drive motor and an oscillation drive for a push rod to which a saw blade can be attached; the push rod being supported in said housing; the improvement therewith which comprises:

a push rod having an angular cross-section;

guide means for guiding part of the length of all sides of said push rod in said housing; said guide means including, on two opposite sides of said push rod, guide surfaces formed by parts of said housing; said guide means further including, in each of the other two sides of said push rod, at least one roller bearing, each of which extends at right angles to the stroke direction; said guide means also including at least one pressure member which acts on said push rod in the vicinity of, and on that side of said push rod opposite from, said oscillation drive; said pressure member loads said push rod in the direction toward said oscillation drive; and a clamping device for holding a workpiece which is to be sawed; said housing having a through hole in the region below said push rod; said through hole receiving a connection member of said clamping device for effecting connection of the latter to said housing;

said clamping device including means for receiving said workpiece, said means being defined by a partially circular bracket having two ends, one of which is provided with clamping jaw means, and the other of which is provided with a clamping spindle for securely holding said workpiece in said bracket.

2. A compass saw according to claim 1, in which said push rod has an approximately rectangular cross-section, and is disposed on edge in said housing.

3. A compass saw according to claim 1, in which said guide surfaces are formed by intermediate walls of said housing, with said push rod being slidingly guided on said walls.

4. A compass saw according to claim 1, in which said roller bearings extend over the entire width of said push rod.

5. A compass saw according to claim 1, in which said roller bearings are needle bearings which are seated on bearing bolts mounted in housing walls which are disposed near that end of said push rod remote from said oscillation drive.

6. A compass saw according to claim 1, in which said pressure member is a ball which bears against said push rod under the force of a spring.

7. A portable compass saw having a housing in which are accommodated a drive motor and an oscillation drive for a push rod to which a saw blade can be attached; the push rod being supported in said housing; the improvement therewith which comprises:

a push rod having an angular cross-section;

guide means for guiding part of the length of all sides of said push rod in said housing; said guide means including, on two opposite sides of said push rod, guide surfaces formed by parts of said housing; said guide means further including, on each of the other two sides of said push rod, at least one roller bearing, each of which extends at right angles to the stroke direction; said guide means also including at least one pressure member which acts on said push rod in the vicinity of, and on that side of said push rod opposite from, said oscillation drive; said pressure member loads said push rod in the direction toward said oscillation drive; and a U-shaped thrust piece for attaching said saw blade to said push rod; said thrust piece having sides which extend over said push rod, and having a cross-piece against which one end of said saw blade rests, with the latter being adapted to be clamped between said cross-piece and said push rod; said cross-piece having a base in which is provided a recess which extends over the entire length of said cross-piece and is provided for accommodating smaller saw blades; adjacent to said sides of said thrust piece, and on at least one side of said recess, said base of said cross-piece being provided with contact surfaces for larger saw blades.

8. A compass saw according to claim 7, which includes a clamping device for holding a workpiece which is to be sawed; said housing has a through hole in the region below said push rod; said through hole receives a connection member of said clamping device for effecting connection of the latter to said housing.

9. A compass saw according to claim 8, in which at least one side of said housing, in the vicinity of said through hole, is provided with outer wall portion means extending parallel to the plane of said saw blade, with said outer wall portion means being provided for the abutment of said connection member of said clamping device.

10. A compass saw according to claim 9, in which two opposite sides of said housing are provided with outer wall portion means which are parallel to one another.

11. A compass saw according to claim 1, in which said clamping spindle is disposed at an acute angle relative to the plane of symmetry of said clamping jaw means.

12. A compass saw according to claim 11, in which said clamping jaw means is provided with two clamping surfaces which are disposed approximately in mirror image relative to one another.

13. A compass saw according to claim 1, in which said connection member of said clamping device includes an extension provided on said bracket, and a bolt which projects from said extension and can be inserted in said through hole of said housing.

14. A compass saw according to claim 13, in which said clamping device has a pivot axis about which said saw can pivot relative to said clamping device; and which includes a stop to limit this pivot movement; said stop is formed by a groove in said connection member, and by counter-member which engages in said groove.

15. A compass saw according to claim 14, in which said groove in said connection member of said clamping device is curved about said pivot axis of the latter; and in which said counter-member is the head of a screw of said housing.

16. A compass saw according to claim 1, which includes a support member having an insertion pin; and in which said housing has an end face from which said saw blade emerges, with said end face, in the vicinity of said saw blade, having an opening for receiving said insertion pin.

17. A compass saw according to claim 16, in which said housing is provided with at least one threaded bore which extends to the outside of said housing, opens into said opening, and extends at right angles to the latter, with said at least one threaded bore receiving a setscrew for securing said insertion pin in said opening.

18. A compass saw according to claim 1, in which said saw blade has two ends, one of which has an end face provided with an insertion opening for a tightening screw; said insertion opening extends in the longitudinal direction of said saw blade, and opens out into said end face.

19. A compass saw according to claim 18, in which said insertion opening is an open-edged slot which extends over half the width of said saw blade, and which is delimited on both sides by clamping sections.

* * * * *